July 12, 1955 H. J. SMITS 2,712,942

TALKING MACHINE

Filed March 8, 1951 2 Sheets-Sheet 1

INVENTOR.

HUBERTUS JAN SMITS

BY Fred M. Vogel

AGENT

INVENTOR
HUBERTUS JAN SMITS
BY [signature]
AGENT

United States Patent Office 2,712,942 Patented July 12, 1955

2,712,942

TALKING MACHINE

Hubertus Jan Smits, Eindhoven, Netherlands, assignor to Hartford National Bank and Trust Company, Hartford, Conn., as trustee Application March 8, 1951, Serial No. 214,563

Claims priority, application Netherlands March 29, 1950

5 Claims. (Cl. 274—14)

This invention relates generally to phonographs and particularly to those in which the records, in order that they be urged into playing position on the turntable thereof, are moved at least substantially rectilinearly over a certain distance in a plane parallel to the turntable.

In such phonographs, the pick-up thereof usually co-operates with a guide member so that it can reach an inoperative position in which it is movable in a plane parallel to the turntable without the needle engaging the record on the turntable, and an operative position in which the needle bears on the record. Phonographs of this type are known in which, for structural or aesthetical reasons, the playing device is completely housed in a cabinet so that it is not accessible during operations. Thus, to permit the introduction of a record in the aforesaid manner, provision is therefore made of a slot in one of the cabinet walls. In such phonographs, the pick-up is rotatably arranged in the conventional manner at the side of the turntable so that the needle follows a slight curvature substantially along the radius of the turntable.

Such phonographs have a limitation in that they require not only a guide mechanism to deposit the record onto the turntable, but also a complicated mechanism to move the pick-up from its inoperative into its operative position. By the last is meant the position wherein the needle is in its correct position at the edge of the record and in engagement therewith. The complication is increased if, as is customary, records of different diameters are to be played. The control of the pick-up may then be automatically effected, for example, with the use of a control member driven by the phonograph motor or manually with the use of an intricate lever mechanism.

In other known constructions, in which the playing device is arranged to be accessible, the record is likewise supplied in the aforesaid manner, but a stationary guide is provided for permitting the pick-up to move in a plane parallel to the turntable and exactly along a radius thereof. In this case, the guide is usually arranged above the turntable center line and along or at some distance parallel to a diameter thereof. The arrangement is such that the pick-up can be moved only manually across the record into its operative position.

The device of the kind to which the invention relates is characterized in that for the movement of the pick-up, when it is in its inoperative position, provision is made of a member which is movably secured to the pick-up and arranged to co-operate with the record during the insertion of the latter into the device, since the said member extends so far in the direction towards the turntable as to be located in the path travelled by the record but clear of the turntable. Furthermore, the guiding means and pick-up arrangement is, for example, provided with frictional means known per se, so that the free motion of the pick-up in its inoperative position is impeded by sufficient friction between the guide member and the pick-up. A primary advantage of this construction according to the invention is that when the record is moved into its playing position on the turntable, the pick-up follows the record. Thus, the pick-up, on reaching the playing position, occupies a favorable position with respect to the record, independently of the size thereof. That is, the pick-up is operatively positioned at the edge of any record inserted into the device so that the playing thereof from the beginning may be done. The over-all result is that the control of the pick-up is greatly simplified.

In the device according to the invention, the extending member connected to the pick-up, viewed in the direction of the movement of the record when inserted into the device, is preferably arranged on that side of the needle which is remote from the side where the record is inserted. A suitable construction is more particularly obtained if the extending member, viewed in the direction of the insertion movement of the record, is at such a distance from the needle that the latter is exactly opposite one of the run-in grooves of the record in its playing position when the said member abuts the edge of the record. Consequently, the said distance corresponds practically to the width of the blank record edge. When a record is supplied to the device, the record edge abuts against the member secured to the pick-up as described hereinbefore so that the latter still in the inoperative position is pushed along the guide member by the record. Owing to the friction mechanism, which is operative in this position of the pick-up, the extending member is prevented from disengaging the record edge during the entire insertion movement of the record. As soon as the record reaches its playing position, the pick-up is required to be moved out of its inoperative position opposite the run-in track of the record into the operative position, in which the needle bears on the record. At this point, the turntable may be at rest or may have previously been set in rotation. Provision has, of course, to be made that in the last-mentioned case, the extending member secured to the pick-up is moved out of contact with the record edge before the pick-up is urged inwardly as the needle thereof rides in the groove in the record.

In the latter case and also if the turntable has not yet been set in rotation, a suitable construction of the phonograph in accordance with the invention is obtained if the extending member is secured to a needle protecting member known per se which is movably fixed to the pick-up. When the pick-up is moved into its operative position, this protecting member is adapted to engage the record and will be moved thereby due to friction upon rotation of the record, so that the needle is gradually lowered into the track or groove. Due to the said movement of the protecting member, the extending member of the pick-up is then moved to such a position that it is out of contact with the record edge, and remains so as long as the protecting member engages the record surface.

It is also possible to omit a protecting device for the needle in moving the pick-up into its operative position whether the turntable is stationary or is rotating during such movement. In such case, the pick-up may be actuated by a manually operated mechanism. When the turntable is rotating, the extending member movably mounted on the pick-up, is then required to be manually moved out of contact with the record simultaneously with the engagement of the needle in the groove. On the other hand, this may be subsequently effected if the turntable is still in the rest position.

After the record has been moved into the playing position, it is furthermore not absolutely necessary that the needle is opposite one of the run-in grooves. It is known that, prior to the playing of the record, the needle may be moved into a position over the blank marginal part of the record. In such case, the pick-up may be provided with a spring which, for example, may be a plate spring that is stretched just before the record reaches the playing position, since it engages a stationary stop. During the aforesaid movement into the operative position, the spring-loaded pick-up may thus execute a radial movement, so that the needle enters the run-in groove of the record. In this case also, the extending member may be moved out of co-operation with the record edge in the aforesaid manner.

After the record has been played, the pick-up which is then as near as possible to the center of the turntable, is required to be moved again into its inoperative position which may, for example, be effected with the use of the aforesaid manually operated mechanism by moving the pick-up in a sense opposite to that of the movement into the operative position.

Since, with the phonograph according to the invention, the control of the movement of the pick-up from the inoperative into the operative position is in part effected by the movement of the record, it is immaterial in what manner the record is moved, whether the record is supplied in its own plane to a turntable secured to the shaft having a stationary support or, once put on the turntable, the shaft of which is movably supported, brings about the said movement of the pick-up jointly with the turntable.

It is, however, immaterial whether the plane of the turntable and thus the plane in which the record is supplied is horizontal or vertical. The use of either plane and those angularly in between are obviously within the purview of the present invention.

In one preferred embodiment of the phonograph according to the invention, the playing device is housed in a cabinet provided with a slot to permit the record to be moved into the playing position. The playing device comprises a stationary linear guide for the movement of the pick-up parallel to the turntable. This guide co-operates with the guide members secured to the pick-up. The turntable shaft is furthermore rigidly secured in the cabinet and in order to make the centering stud of the turntable visible the upper part of the slotted cabinet wall is tiltable from the side thereof where the record is inserted about a shaft or hinge located in the proximity of the center of the turntable. In this manner a guide mechanism for the insertion of the record may be dispensed with.

In order that the invention may be more clearly understood and readily carried into effect, it will now be described in detail with reference to the accompanying drawings, in which.

Figure 1:
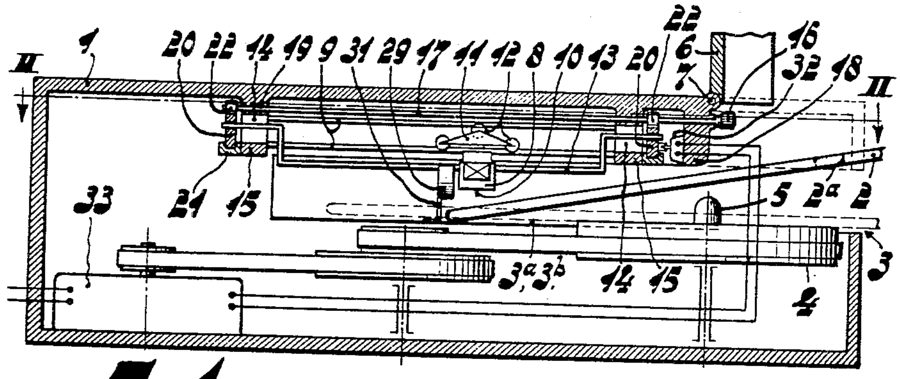
Fig. 1 is a vertical cross-sectional view of a diagrammatic representation of one embodiment of the phonograph according to the invention; the section being taken on the line I—I in Fig. 2.
Figure 2:
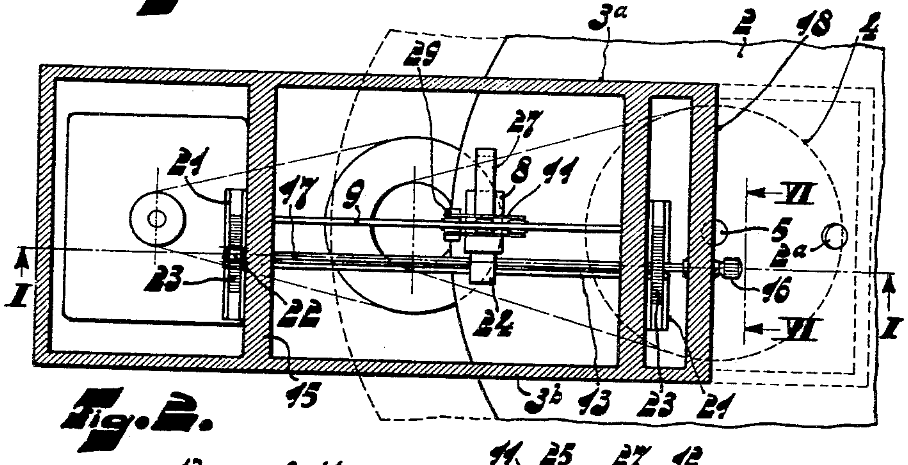
Fig. 2 is a horizontal cross-sectional view of the phonograph shown in Fig. 1; the section being cut on the line II—II in Fig. 1.

The embodiment of the phonograph according to the invention shown in Figs. 1 to 6 comprises a cabinet 1, in which the playing device is so housed as to be inaccessible during the operation thereof. Hence, the record 2 to be played must be inserted through a slot 3 formed in three of the cabinet walls as indicated in Figs. 1 and 2. In order to move a record 2 into the playing position on the turntable 4, which is located in a horizontal plane close behind the slot 3, the record 2 is required to be slipped manually through the slot 3 approximately along a straight line in a plane parallel to the turntable 4, the record being guided partly by the plane of the turntable 4 and the edges 3*a* and 3*b* of the slot 3. In order to facilitate the centering of the record, the centering stud 5 of the turntable 4 may be made visible since the part of the cabinet wall bounding the upper edge of the slot 3 is preferably made tiltable as a lid 6 about a hinge 7 in the proximity of the center of the turntable 4.

Figure 3:
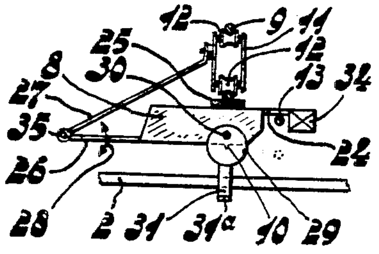
Fig. 3 is a side elevational view on a slightly enlarged scale of the pick-up shown in the preceding figures.
Figure 4:
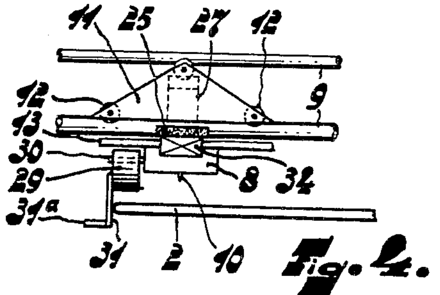
Fig. 4 is a front elevational view of the pick-up shown in Fig. 3.
Figure 5:
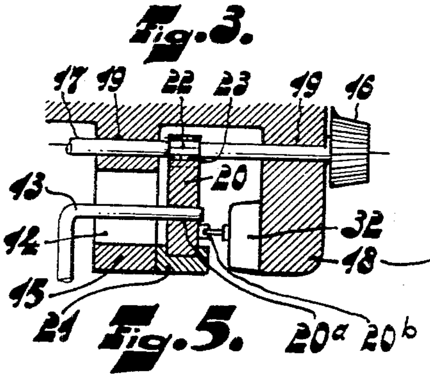
Fig. 5 shows that part of Fig. 1 on an enlarged scale which is in the region of the manual means for actuating the pick-up and switch.
Figure 6:
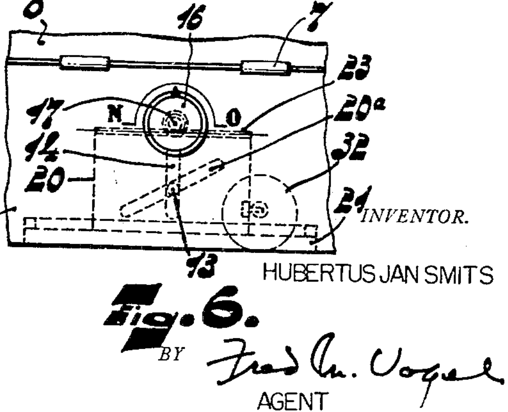
Fig. 6 is a front view on an enlarged scale of that part of the phonograph shown in Fig. 5.

The pick-up 8 is movable along a linear guide 9 rigidly secured to the cabinet, so that the needle 10 is movable along a radius of the turntable 4. The linear guide 9 comprises two parallel straight rods 9′ and 9″ which are located in a plane preferably parallel to the turntable 4. The rods 9′ and 9″ serve to guide a guide member 11 secured to the pick-up and as best seen in Figs. 3 and 4, comprising a carriage 11′ having three wheels 12 running between the guide rods 9′ and 9″. The guide rods 9′ and 9″ have a length slightly exceeding half the diameter of the largest record to be played. By means of a simple mechanism the pick-up 8 can be moved into an inoperative position, in which it is movable in a plane parallel to and above the turntable 4, and into an operative position, in which the needle 10 of the pick-up 8 bears on the record 2. This mechanism (best seen in Figs. 1, 5 and 6) comprises a rod 13 which extends parallel to the guide rods 9′ and 9″ and is movable along two slots 14 provided at right angles to the turntable 4 in two supports 15 secured to the cabinet. By manual control of a knob 16 secured to a rod 17 which is journalled in bearings 19 in the said supports 15 and a control panel 18 provided at the front side of the cabinet, two plates 20, each comprising a slanting slot 20*a* are movable laterally along horizontal guides 21, since pinions 22 seated on the rod 17 co-operate with racks 23 secured to the plates 20. Thus the rod 13, which is guided by the vertical slots 14 in the supports 15 is movable vertically by the bearing thereon of the edges of the slanting slots 20*a* in the plates 20. The pick-up 8 is secured to the rod 13 by means of a hook element 24 and is therefore movable towards and away from the turntable 4 by moving up and down the said rod 13 by turning the knob 16 as described hereinabove. The length of the vertical slots 14 slightly exceeds the space between the point of the needle 10 in the inoperative position of the pick-up 8 and the surface of the record 2 positioned on turntable 4, so that when the needle point 10 engages the record 2 the rod 13 may be out of contact with the hook element 24. In the upper position of the rod 13, which coincides with the zero position of the knob 16, the top of the pick-up 8, which is provided with a friction surface 25, is urged with a sufficient force against the bottom guide rod 9″, so that the free lateral movement of the pick-up 8 is hampered.

Through the intermediary of an articulated bar system 26, 27 of which the rod 26 is secured to the pick-up 8 and the rod 27 to the carriage 11′, the pick-up 8 (as best seen in Fig. 3) is secured to the carriage 11′ in a manner such that, if the carriage 11′ is at rest, the pick-up 8 can be moved up and down in a plane at right angles to the linear guide 9 in the direction of the arrow 28. By exerting a force on the pick-up 8 in the direction of the linear guide 9 via engagement of the needle 10 and the groove of the record 2 when the record is played, the carriage 11′ is caused to follow because of the connection therebetween by means of the bar system just described. The pick-up 8 is furthermore provided with a protecting member 29 for the needle 10 known per se. Such member may be rotatable about an eccentric shaft 30. As soon as the pick-up 8 is caused to move towards the record 2 by operation of the knob 16, the member 29 engages the record 2 and turns on shaft 30 due to the frictional engagement between the member 29 and the moving record. Thus, the needle 10 is gradually lowered onto the record 2. According to the invention, the protecting member 29 is provided with an extending member 31 which, in the inoperative position of the pick-up 8, extends in the direction toward the turntable into the path of the record (shown in broken lines in Figure 1) but is clear of the turntable 4. The extending member 31 is secured to the protecting member 29 in such a manner that due to the rotary movement of the latter as described, the member 31 is moved out of contact with the record.

The device operates as follows: The lid 6 of the cabinet is lifted and kept open, so that the centering stud 5 is visible on the turntable 4. The diameter of the turntable 4 is equal to the diameter of the blank central part of the record 2 to reduce the size of the phonograph. The record 2 is slipped through the slot 3 and guided substantially into a horizontal position by the edges 3*a* and 3*b* of the slot 3 until the aperture 2*a* of the record 2 reaches the centering stud 5 of the turntable 3 and the record 2 is in the playing position. During the inserting movement, the edge of the record 2 abuts against the member 31 of the pick-up 8, the latter being in the inoperative position and as near as possible to the center of the turntable 4. Since the member 31 is positioned relative to the needle 10 at a distance equal to the dimension of the blank record edge from the needle 10 when reckoned in the direction of the insertion movement of the record, the said needle 10 is exactly over one of the run-in grooves of the record 2, as soon as the record edge engages the extending member 31 of the pick-up 8. The needle 10 maintains this position with respect to the record 2 during the insertion of the latter into the playing position on the turntable 4, since the guidance of the pick-up 8 is such that the free longitudinal movement of the latter is impeded by the friction surface 25 of the pick-up 8 in engagement with the guide rod 9″. As soon as the record 2 reaches the playing position, the knob 16 is moved into the position *n* in Fig. 6. Plate 20 is thus moved to the right as viewed in Fig. 6 by means of the rack 23 and pinion 22 linkage. In consequence the lower section of slots 20*a* is placed in alignment with slots 14 and the rod 13 and with it the pick-up 8, move in the aforesaid manner towards the turntable 4 and the protecting member 29 of the needle is lowered on the record 2. When the pointer of the knob 16 passes a particular position on the panel 18 during the movement into the position "*n*," the movement of a lug 20*b* secured to plate 20 closes a switch 32 which is included in the circuit of a motor 33 so that the turntable 4 is actuated. The pick-up 8 is then moved into the operating position by the automatic turning away of the protecting member 29 as described previously, the needle 10 being gradually lowered into the track in the aforesaid manner. In the operative position of the pick-up 8, the extending member 31 is moved out of engagement with the record edge by the movement of the protecting member 29. The switch 32 may alternatively be controlled without co-operation of the plate 20, for example, by means of a separate handle, if desired. In such case, the turntable 4 may still be at rest when the protecting member 29 engages the record surface.

During the playing of the record the protecting member 29 drags over the record; the extending member 31 remaining out of engagement with the record 2. After the record 2 has been played, the knob 16 is required to be moved into the zero position (Fig. 6) to move the pick-up 8 into the inoperative position. During this movement the switch 32 is operated in the reversed sense and the circuits of the turntable motor 33 are broken. As soon as the knob 16 reaches the zero position, the friction surface 25 at the top of the pick-up 8 again engages the lower linear guide rod 9″ with a slight pressure. The member 31 then rests by means of a support 31*a* secured to the bottom thereof and arranged at right angles and in the direction of the linear guide 9, in an oblique position on the record 2. The latter may readily be taken out of the phonograph by hand, since the record edge protrudes from the cabinet as seen in Fig. 1. The member 31 of the pick-up 8 subsequently takes up a vertical suspended position by the action of gravity. Since the dimension of the turntable 4 is chosen to be smaller than the diameter of the running-out groove of the record, for this reason, the member 31 is clear of the turntable 4 in the inoperative position of the pick-up 8.

The turntable 4 may alternatively be of normal size, but then the size of the member 31 is required to be such that in the inoperative position of the pick-up 8 the part 31*a* is at a distance less than the thickness of a record above the surface of the turntable 4. In order to avoid damage when inserting the record 2, the needle 10 protrudes only about one millimeter from the pick-up 8 and is located approximately in a plane extending through the linear guide 9 at right angles to the record. The pick-up comprises a weight 34 which is arranged at a distance from the center of rotation 35 of the pick-up 8 such that the latter is statically balanced with respect to the needle, with the result that the reaction forces between the guide rods 9′ and 9″ and the wheels 12 of the carriage 11′ transverse to the guide rods are at a minimum. Due to the aforesaid position of the needle 10 relative to the linear guide 9, a minimum force is required to actuate the system.

Figures 7, 8, 9, 10:
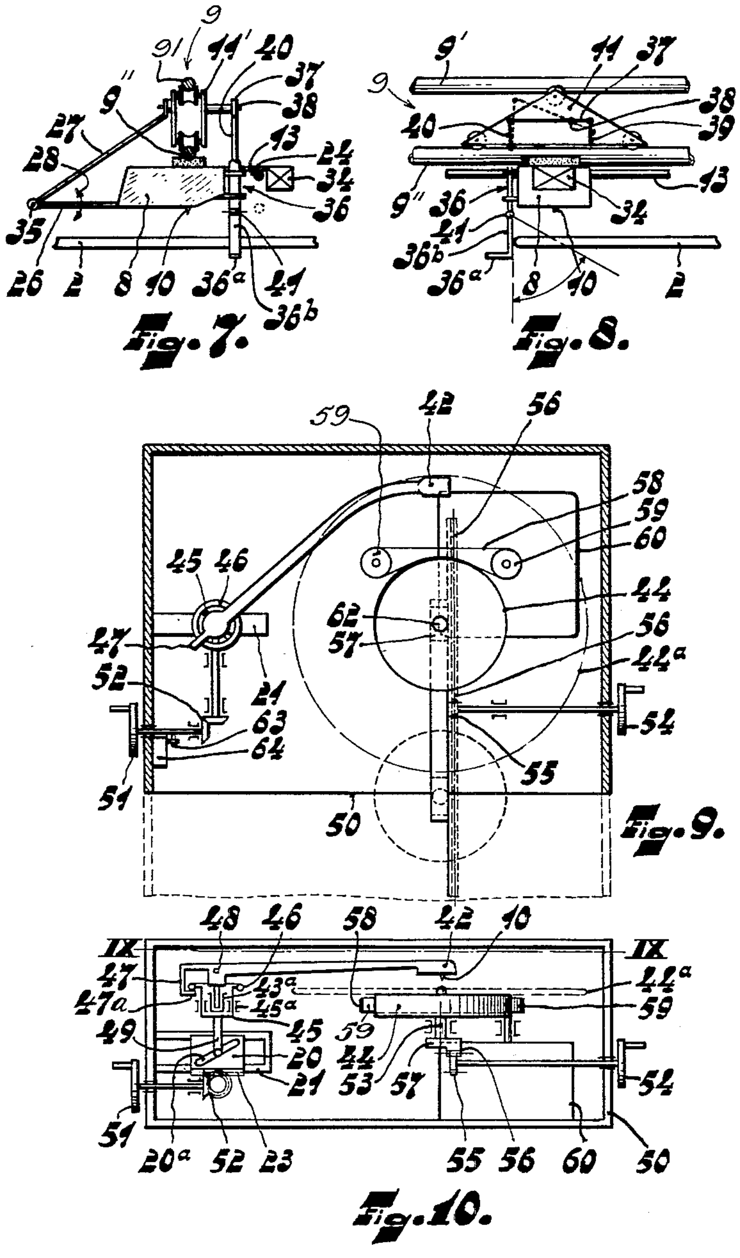
Fig. 7 is a side elevational view of another embodiment of the pick-up shown in Figs. 1 to 4.
Fig. 8 is a front elevational view of the pick-up illustrated in Fig. 7.
Fig. 9 is a horizontal cross-sectional view of a further embodiment of the phonograph according to the invention; the cabinet being cut on the line IX—IX of Fig. 10.
Fig. 10 is a front view of the phonograph shown in Fig. 9.

In the embodiment of the device according to the invention shown in Figs. 7 and 8, the protecting member of the needle 10 can be dispensed with. The parts corresponding to those shown in the preceding figures bear the same reference numerals. The member 36 according to the invention is secured to the pick-up 8 in a manner such that it can be moved up and down and is furthermore located, viewed in the direction of insertion of the record, at a distance from the needle corresponding to the width of the blank record edge. To the frame of the carriage 11 is secured a lever 37 which is movable about a spindle 38 in a plane parallel to the linear guide 9 at right angles to the record 2. A lever 39 is articulated both to one end of the rod 37 and to the pick-up 8, a second lever 40 being articulated both to the other end of the lever 37 and to the member 36. When the pick-up 8 is lowered, the member 36 is raised, the size of the member 36 required to be clear of the record 2 as soon as the pick-up 8 reaches its operative position, being derivable from the distance between the record surface and the point of the needle 10 in the inoperative position of the pick-up 8 by a suitable choice of the ratio between the distances of the spindle 38 of the carriage frame 11′ from the two ends of the lever 37. After the record 2 has been played and the pick-up 8 is lifted, for example, by means of the aforesaid mechanisms 16, 20, 13, 24, 17, described with respect to the embodiment disclosed in Figs. 1–6, during which movement the turntable 4 has come to a standstill under the control of the motor switch 32, the bottom part of the member 36 provided with a rectangular support 36*a* engages the record surface. When the knob 16 is further moved into the position "0," the support 36*a* bears on the record with a certain pressure. In order to avoid damage when the record 2 is removed from the phonograph, the rectangular bottom part 36*b* of the member 36 and on which support 36*a* is mounted, can be tilted about a spindle 41 in the direction of removal of the record 2 as indicated by the two-headed arrow in Fig. 8. The connection between the movable parts of the member 36 is furthermore such that the said parts cannot be tilted beyond the position in which they are in line with each other.

Referring to Figs. 9 and 10, in which parts corresponding to those of the preceding figures bear the same reference numerals, the pick-up 42 is mounted so as to be rotatable about a vertical shaft 43 at the side of the turntable 44 so that the needle 10 describes a slight curvature substantially along the radius of a record 44*a* on the turntable. The pick-up 42 is movable from the inoperative into the operative position by means of a U-shaped rod 45 which is movable in a vertical direction and comprises a circular bead 46 concentric with the rod 45. A hook 47 secured to the pick-up 42 is arranged to engage the bottom of the bead 46 by means of an inturned projection 47*a* with a certain friction when the pick-up 42 takes an inoperative position. The pick-up 42 is furthermore rotatably secured to the rod 45 and is rotatable about a horizontal shaft 48. The pick-up 42 can be moved up and down with the use of a device similar to that shown in Fig. 6. For this purpose, a member 49 secured to the rod 45 is movable up and down in the slanting slot 20*a* of the plate 20, when the said plate 20 is moved reciprocatively along the guide 21 by turning a knob 51 protruding from the cabinet 50 containing the playing device, through gears 52 and the rack 23 secured to the plate 20. The turntable 44 is arranged with its shaft 53 to be movable along a line. By means of a knob 54 provided laterally of the cabinet and actuating a rack 56 by means of a gear wheel 55, the turntable can be moved to the front side of the cabinet into the position indicated in broken lines in Fig. 9, since the rack is secured to the support 57 of the turntable shaft 53. In the position of the turntable shown in full lines, its edge bears with a certain pressure on a driving belt 58 which passes over the pulleys 59 of the motor 60. In the position of the turntable 44 shown in broken lines, in which it partly protrudes from the cabinet 50 so that the centering stud 62 is visible, the record 44*a* to be played can be put on the turntable 44. By operating the knob 54, the record 44*a* together with the turntable 44, is moved into the playing position shown in full lines in Fig. 9. Alternatively, this outward and inward movement of the turntable 44 may, for example, be effected with the use of a mechanism which is adapted to convert a rotating movement into a translating movement, the latter being effected by opening or closing the front wall, which in this case is hinged at the base plate of cabinet 1. The front wall is shown in opened position in broken lines in Fig. 9. Upon introduction of the record 44*a* its edge abuts in the aforesaid manner against the member secured to the pick-up in accordance with the invention. After the record has reached the playing position, the knob 51 is operated. The member according to the invention is secured to the needle in the aforesaid manner. Just before the protecting member engages the record surface, a stop 63 seated on the shaft of the knob 51, abuts against a switch 64 included in the circuit of the electric motor 60, so that the turntable 44 is set in rotation and the needle 10 finds its way to the run-in groove of the record 44*a* in the aforesaid manner.

Having described several preferred forms of the present invention and certain modifications thereof, it will be evident that various changes therein may be made by persons skilled in the art without departing from the spirit and scope of the present invention. Consequently, it is to be understood that the foregoing description is to be considered illustrative of, rather than limitative upon, the appended claims.

What I claim is:

1. A phonograph comprising a housing, a turntable mounted within said housing, said housing having an aperture through which a record may be inserted laterally of said turntable and substantially parallel in the plane thereof to an operative position thereon, a pick-up having a needle mounted thereon, means movably mounting said pick-up in said housing, said means being disposed for guiding said movable pick-up along a plane parallel to said plane of said turntable, means including an element being provided with an angular slot, a part operatively connected to said pick-up and adapted for movement in said slot thereby permitting said pick-up to move in directions toward and away from said turntable, respectively, to a first position wherein said needle is closer to the plane of said turntable whereby said needle may engage a record on said turntable, and to a second position wherein said needle is displaced from said turntable whereby said needle is disengaged from a record on said turntable, a member movably mounted on said pick-up and extending therefom towards said turntable to a region closer at least to the plane of said turntable than the thickness of a record to be placed thereon even when said pick-up is in said second position, said member being positioned on said pick-up in laterally displaced relationship with respect to said needle and at the side thereof remote from said aperture, and means for retarding the movement of said pick-up along said guide means when the former is in said second position.

2. A phonograph comprising a housing, a turntable mounted within said housing, said housing having a horizontal slot through which a record may be inserted laterally of said turntable and substantially parallel to the plane thereof to an operative position thereon, a pick-up having a needle mounted thereon, means movably mounting said pick-up in said housing, said means being disposed for guiding said movable pick-up linearly along a plane parallel to said turntable, means for permitting said pick-up to move in directions toward and away from said turntable, respectively, to a first position wherein said needle is closer to the plane of said turntable whereby said needle may engage a record on said turntable, and to a second position wherein said needle is displaced from said turntable whereby said needle is disengaged from a record on said turntable, a member movably mounted on said pick-up and extending therefrom toward said turntable and to a region closer at least to the plane of said turntable than the thickness of a record to be placed thereon even when said pick-up is in said second position, means for retarding the movement of said pick-up along said guide means when the former is in said second position, and movable wall means attached to said housing and defining the upper edge of said horizontal slot, said wall means being movable to a position for widening the aperture of said slot whereby insertion of a record on said turntable is facilitated.

3. A phonograph comprising a housing, a turntable mounted within said housing, said housing having a slot through which a record may be inserted only laterally of said turntable and substantially parallel to the plane thereof to an operative position thereon, a guide member, a pick-up having a needle mounted thereon and being pivotally connected to said guide member, means movably mounting said guide member and said pick-up in said housing, said means including a pair of rod guides being disposed for guiding said guide member and said movable pick-up along a plane parallel to said plane of said turntable, means for permitting said pick-up to move in directions toward and away from said turntable in a line radial to said turntable, respectively, to a first position wherein said needle is closer to the plane of said turntable whereby said needle may engage a record on said turntable, and to a second position wherein said needle is displaced from said turntable whereby said needle is disengaged from a record on said turntable, a member adapted to engage the record when said pick-up is in said first position, said member being movably mounted on said pick-up and in said second position extending therefrom further than said needle, said member due to friction against the rotating record being movable into said first position in which said needle engages the record, and said member extending toward said turntable to a region closer at least to the plane of said turntable than the thickness of a record to be placed thereon even when said pick-up is in said second position, and means secured to said pick-up for retarding the movement of said pick-up along said guide means when the former is in said second position.

4. A phonograph comprising a housing, a turntable mounted within said housing, said housing having a slot through which a record may be inserted only laterally of said turntable and substantially parallel to the plane thereof to an operative position thereon, a guide member, a pick-up having a needle mounted thereon and being pivotally connected to said guide member, means movably mounting said guide member and said pick-up in said housing, said means including a pair of spaced, parallel rod guides being disposed for guiding said guide member and said movable pick-up along a plane parallel to said plane of said turntable, means for permitting said pick-up to move in directions toward and away from said turntable in a line radial to said turntable, respectively, to a first position wherein said needle is closer to the plane of said turntable whereby said needle may engage a record on said turntable, and to a second position wherein said needle is displaced from said turntable whereby said needle is disengaged from a record on said turntable, a protecting member movably mounted on said pick-up and having a part extending therefrom and adapted for movement therewith and said part extends therefrom further than said needle, said protecting member due to friction against the rotating record being movable to said first position in which said needle engages the record, said part extending from said protecting member in the direction of said turntable toward a region closer at least to the plane of said turntable than the thickness of a record to be placed thereon even when said pick-up is in said second position, means mounting said member on said pick-up in laterally displaced relationship with respect to said needle at a distance therefrom substantially equal to the distance between the edge of the record and the run-in groove thereof, and at the side of said needle remote from said aperture, and means for retarding the movement of said pick-up along said guide means when the former is in said second position.

5. A phonograph comprising a housing, a turntable mounted within said housing, said housing having an aperture through which a record may be inserted laterally of said turntable and substantially parallel to the plane thereof to an operative position thereon, a guide member, a pick-up having a needle mounted thereon and being connected to said guide member, said connection including an arm mounted on said guide member in a substantially lateral direction and an arm mounted on said pick-up also in a substantially lateral direction, said arms being pivotally connected at a point remote from both said guide member and said pick-up, means movably mounting said pick-up and said guide member in said housing, said means being disposed for guiding said movable pick-up along a plane parallel to said plane of said turntable, means for permitting said pick-up to move in directions toward and away from said turntable in a line radial to said turntable, respectively, to a first position wherein said needle is closer to the plane of said turntable whereby said needle may engage a record on said turntable, and to a second position wherein said needle is displaced from said turntable whereby said needle is disengaged from a record on said turntable, a protecting member for protecting the needle and adapted to engage the record when the pick-up is in said first position, said protecting member being movably mounted on said pick-up and in said second position extending therefrom further than the needle, said protecting member owing to friction against the rotating record being movable with said pick-up to said first position in which the needle engages the record, and means on said pick-up coacting with said guide means for retarding the movement of said pick-up along said guide means when the former is in said second position, and a member mounted on said protecting member for movement therewith and extending therefrom toward said turntable, said member being out of engagement with the record in said first position and abutting the record edge in said second position.

References Cited in the file of this patent

UNITED STATES PATENTS

| | | |
|---|---|---|
| 1,334,076 | Brown | Mar. 16, 1920 |
| 1,417,111 | Schlesinger | May 23, 1922 |
| 1,673,235 | Fageol | June 12, 1928 |
| 1,868,304 | Cargill | July 19, 1932 |
| 2,100,686 | Collaro | Nov. 30, 1937 |
| 2,334,649 | Recker | Nov. 16, 1943 |
| 2,372,672 | Hultgren | Apr. 3, 1945 |
| 2,506,665 | Giovannucci | May 9, 1950 |
| 2,508,845 | Thompson | May 23, 1950 |
| 2,586,422 | Fisher | Feb. 19, 1952 |